United States Patent Office 3,057,302
Patented Oct. 9, 1962

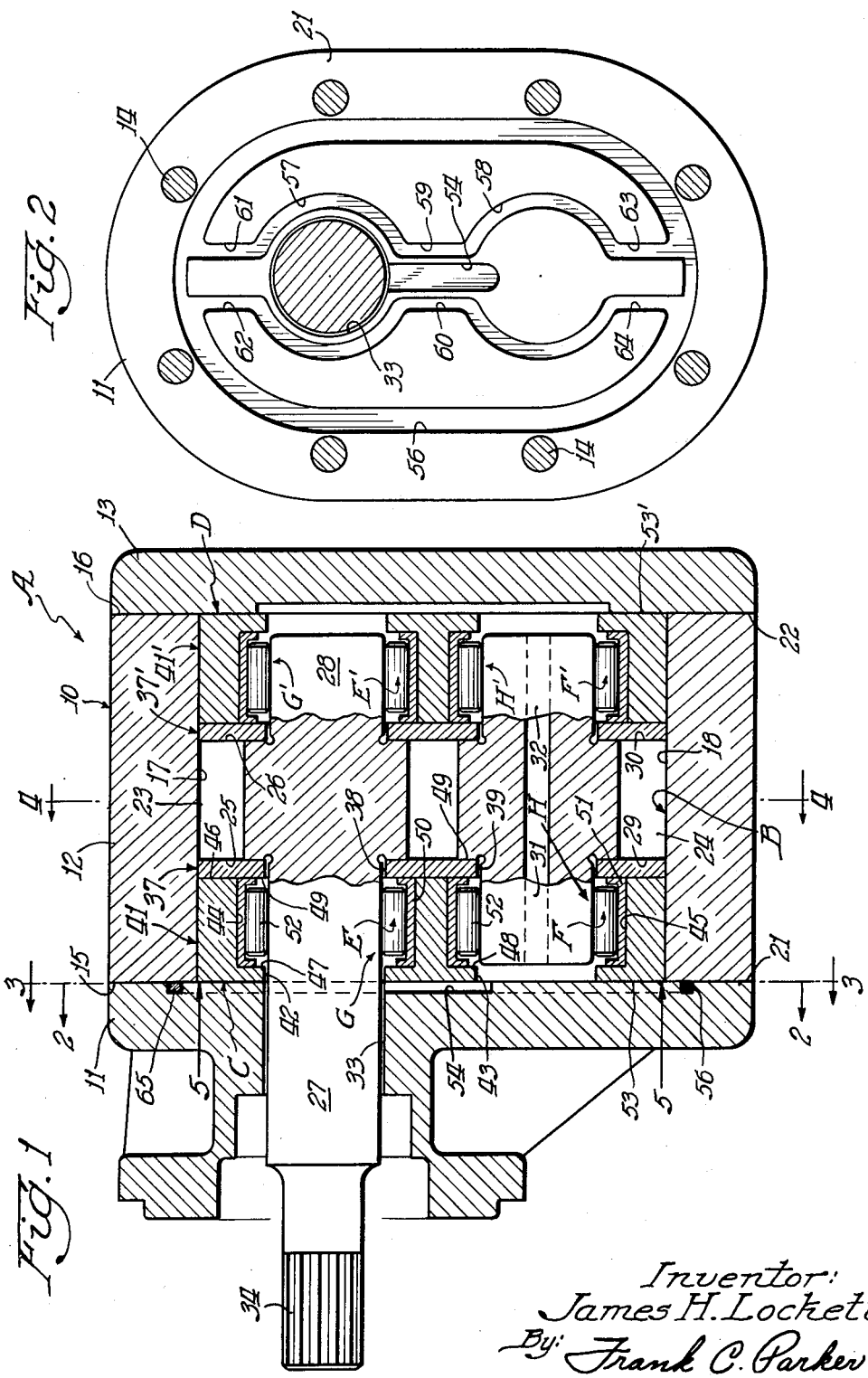

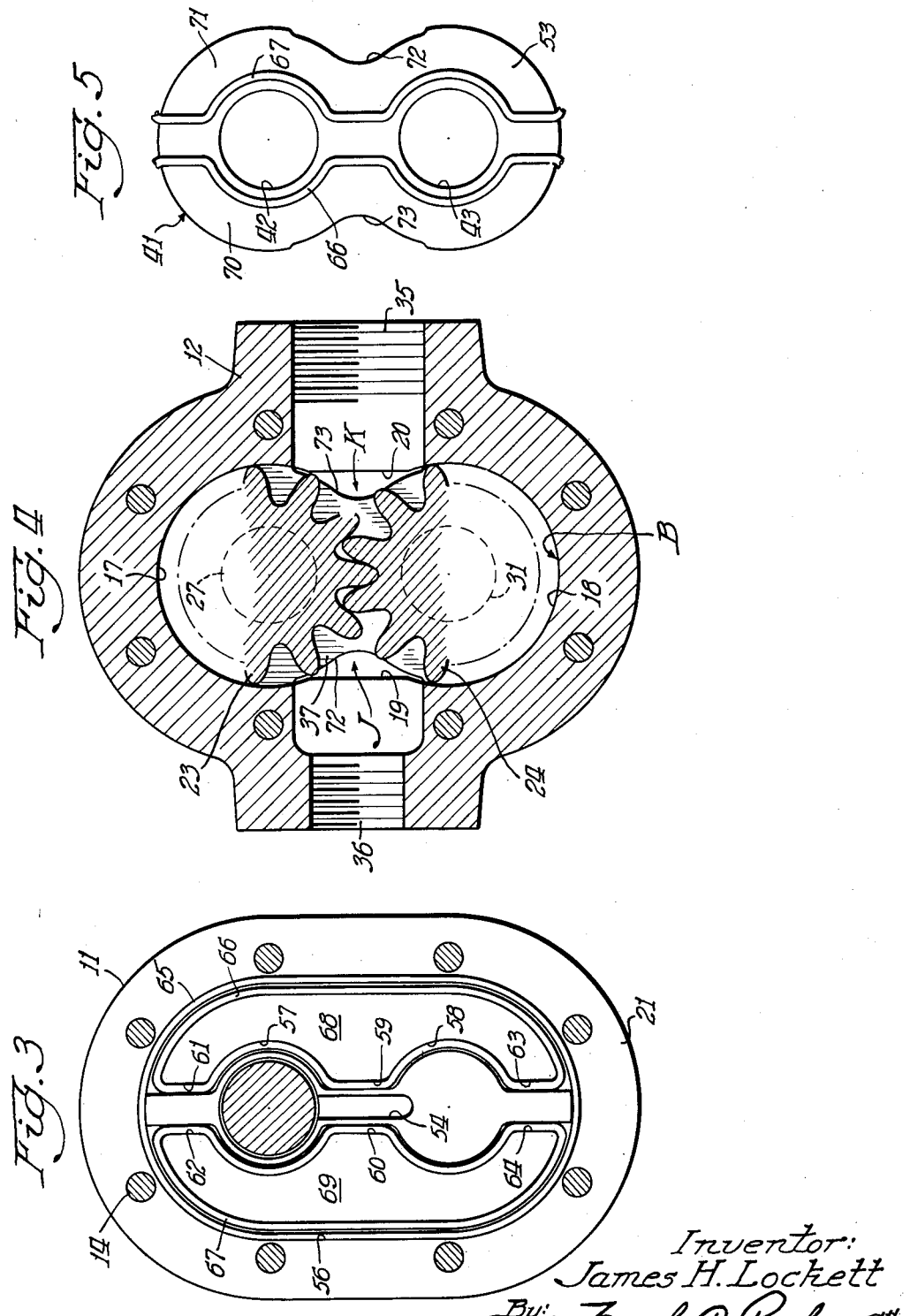

3,057,302
PRESSURE LOADED HYDRAULIC APPARATUS
James Herbert Lockett, Wooster, Ohio, assignor to Borg-Warner Corporation, Chicago, Ill., a corporation of Illinois
Filed Mar. 24, 1959, Ser. No. 801,490
12 Claims. (Cl. 103—126)

This invention relates to a pressure loaded hydraulic apparatus, and, in particular, relates to a pressure loaded pump or motor comprising a housing having rotatable means disposed therein for receiving fluid from an inlet and delivering the same out an outlet, and having axially movable bearing means disposed in the housing and rotatably supporting the rotatable means, the axially movable bearing means being adapted to be axially moved into sealing engagement with the rotatable means by the force of fluid pressure applied to a rear surface of the bearing means in such a manner that the bearing means is urged into sealing engagement with the rotatable means with a greater force on the outlet side of the bearing means than on the inlet side thereof.

It is well known in the art to construct pressure loaded pumps or motors, and, in particular, to construct pressure loaded gear type pumps or motors.

The conventional pressure loaded gear type pump or motor comprises a housing having a pair of parallel intersecting bores formed therein, a pair of meshing rotatable gears disposed respectively in the bores, and bearing means disposed respectively in the bores for respectively rotatably supporting the gears and having front surfaces adapted to engage the respective side faces of the gears to provide a seal therewith whereby the rotated gears (when acting as a pump) draw fluid from an inlet formed in the housing, pressurize the fluid, and force the same under pressure out an outlet formed in the housing. The bearing means normally comprise two pairs of adjacent bearings, one pair of the bearings being fixed relative to the housing and the other pair of bearings being adapted to be axially moved into sealing engagement with the respective side faces of the gears to provide seals therewith. Each bearing is provided with a bore passing therethrough adapted to receive an adjacent journal extending from an adjacent side face of the respective gear. Sometimes the bearing means comprise a pair of one-piece bearings, one bearing being fixed relative to the housing and respectively supporting the adjacent journals of the pair of rotatable gears within a pair of bores passing therethrough and the other bearing supporting the other pair of adjacent journals of the gears and being adapted to be axially moved into sealing engagement with the adjacent side faces of the gears to provide a seal therewith. The axially movable bearing or bearings are normally each provided with a rear motive surface which is subject to the application of the force of the outlet pressure fluid whereby the force thereof tends to axially move the bearing or bearings into sealing engagement with the respective gear side faces or face.

It is commonly believed that a pressure gradient condition exists across the front faces of the bearings, i.e., when the hydraulic apparatus is acting as a hydraulic pump, the force of the fluid conveyed by the gear teeth from inlet to outlet progressively increases from inlet to outlet thereby tending to axially move the bearing or bearings away from the gear side faces with a greater force on the outlet side thereof than on the inlet side thereof. Therefore, various bearing designs have been constructed to compensate for this pressure gradient condition.

One type of bearing design, which has been constructed to compensate for this pressure gradient condition includes a rear motive surface which is offset toward the outlet side thereof whereby a greater resultant force of the fluid pressure acts against the outlet side of the bearing than against the inlet side thereof thereby tending to axially move the bearing toward the respective gear side face or faces in a manner to compensate for the pressure gradient condition existing across the front face of the bearing.

However, when constructing a pressure loaded pump or motor of the above described type, it has been found that when it is desired to utilize the hydraulic apparatus as a hydraulic pump and change the direction of the flow of fluid therethrough, the hydraulic apparatus must be disassembled in order to invert the bearings so that the offset motive surfaces thereof will be disposed adjacent the new outlet side of the apparatus to compensate for the new pressure gradient condition.

In order to provide for reverse flow through the hydraulic apparatus without changing the position of the bearings, bearings have been designed whereby the rear motive surface thereof is divided into two substantially equal isolated areas, one of the areas being disposed adjacent the inlet and fluidly interconnect therewith and the other area being disposed adjacent the outlet and fluidly interconnected therewith. In this manner, regardless of the direction of the flow of the hydraulic fluid, the high pressure side of the apparatus is interconnected with the isolated area of the rear motive surface disposed adjacent thereto and the low pressure side of the hydraulic apparatus is interconnected with the other isolated area disposed adjacent thereto whereby the pressure gradient condition existing across the front surface of the bearing is overcome.

Therefore, it is an object of this invention to provide an improved hydraulic apparatus of the last described type.

Another object of this invention is to provide an improved pressure loaded hydraulic apparatus wherein the pressure gradient condition is compensated for by the particular construction of the pressure loaded bearing means regardless of the direction of the flow of the hydraulic fluid therethrough.

Another object of this invention is to provide a hydraulic apparatus comprising, a housing having a cavity and a pair of end walls closing off the cavity, rotatable means disposed in the cavity, an inlet and an outlet leading respectively to and from the rotatable means whereby the rotatable means is adapted to receive fluid from the inlet and deliver the same out the outlet, axially movable bearing means disposed in the cavity and rotatably supporting the rotatable means, the bearing means including a plurality of roller means in engagement with the rotatable means, the bearing means having a front surface adapted to sealably engage the rotatable means and a rear surface adapted to cooperate with an adjacent end wall to define a chamber, sealing means disposed between the rear surface and the end wall and dividing the surface into a plurality of isolated segments, and means for conveying fluid to at least one of the segments whereby the force of the fluid urges the bearing means towards the rotatable means to thus place the front surface thereof in sealing engagement with the rotatable means.

Other and more particular objects, advantages, and uses of this invention will become apparent from a reading of the following specification taken in connection with the accompanying drawings forming a part thereof and wherein:

FIGURE 1 illustrates, in an axial cross-sectional view, a hydraulic apparatus formed in accordance with the teachings of this invention.

FIGURE 2 illustrates, in an axial cross-sectional view, a portion of the hydraulic apparatus illustrated in FIGURE 1 and is taken on line 2—2 thereof.

FIGURE 3 illustrates, in an axial cross-sectional view, certain operating parts of the hydraulic apparatus illustrated in FIGURE 1 and is taken on line 3—3 thereof.

FIGURE 4 illustrates, in an axial cross-sectional view, certain other operating parts of the hydraulic apparatus illustrated in FIGURE 1 and is taken on line 4—4 thereof.

FIGURE 5 illustrates, in an axial cross-sectional view, a portion of the apparatus illustrated in FIGURE 1 and is taken on line 5—5 thereof.

Reference is now made to the accompanying drawings wherein like reference letters and numerals are used throughout the various figures thereof to designate like parts where appropriate, and particular reference is made to FIGURE 1 illustrating a hydraulic apparatus, generally indicated by the reference letter A, formed in accordance with the teachings of this invention and including a housing 10 comprising a plurality of housing sections 11, 12, and 13 suitably secured together in aligned relation by a plurality of bolts 14.

The housing section 12 has a pair of opposed flat ends 15 and 16 interrupted by a pair of parallel and intersecting bores 17 and 18. The housing section 12 is further cut away at the juncture of the bores 17 and 18 to provide a pair of parallel opposed flat sides 19 and 20 respectively intersecting the bores 17 and 18 (see FIGURE 4. The housing section 11 has a substantially flat end wall 21 which is adapted to sealably abut the flat surface 15 of the housing section 12 when assembled in aligned relation therewith. Similarly, the housing section 13 has a substantially flat end wall 22 adapted to sealably abut the flat surface 16 of the housing section 12 when secured thereto. Therefore, it can be seen that the end walls 21 and 22 of the respective housing sections 11 and 13 cooperate with the bores 17 and 18 of the housing section 12 to define a cavity B within the housing 10.

A pair of rotatable gears 23 and 24 are disposed within the cavity B, the gear 23 being disposed within the bore 17 and the gear 24 being disposed within the bore 18 in such a manner that the gears 23 and 24 mesh at the juncture of the bores 17 and 18. The gear 23 is provided with a pair of opposed sides 25 and 26 and a pair of opposed journals 27 and 28 extending respectively from the sides 25 and 26. Similarly, the gear 24 is provided with a pair of opposed sides 29 and 30 and a pair of journals 31 and 32 extending respectively from the sides 29 and 30 thereof.

The journal 27 of the gear 23 extends through bore 33 formed in the housing section 11 and is provided with a splined end 34 adapted to be interconnected to a suitable power source (not shown).

The journals 27 and 31 of the respective gears 23 and 24 are rotatably supported within the cavity B by bearing means C disposed within the cavity B. Similarly, the journals 28 and 32 of the respective gears 23 and 24 are rotatably supported within the cavity B by bearing means D disposed within the cavity B. In this manner, when the hydraulic apparatus A is acting as a hydraulic pump and the drive gear 23 is being rotated by the power source (not shown), the gears 23 and 24 are counter-rotated through the meshing relation thereof and are adapted to receive fluid from an inlet 35 formed in the housing 10, pressurize the same, and deliver the fluid out through an outlet 36 formed in the housing 10 (see FIGURE 4).

The bearing means C and D are formed in substantially the same manner except that the bearing means D is fixed relative to the housing 10 whereas the bearing means C is adapted to be axially movable relative to the housing 10. Therefore, only the particular details of the bearing means C will be described. However, the part of the bearing means D, corresponding to the part of the bearing means C hereinafter described, is indicated by the same reference numeral with a prime.

The bearing means C includes a wear plate 37 having a pair of parallel bores 38 and 39 formed therethrough and adapted to respectively receive the journals 27 and 31 of the respective gears 23 and 24. In this manner, a flat front surface 40 of the wear plate 37 is adapted to respectively sealably engage the adjacent sides 25 and 29 of the respective gears 23 and 24 in a manner later to be described.

The bearing means C also includes a member 41 having a pair of bores 42 and 43 passing therethrough in a manner similar to the bores 38 and 39 of the wear plate 37. The bores 42 and 43 are adapted to respectively receive the journals 27 and 31 of the respective gears 23 and 24. The member 41 is counterbored by bores 44 and 45 respectively interrupting an end surface 46 thereof and disposed coaxially with the bores 42 an 43. The bores 44 and 45 terminate within the member 41 to respectively define shoulders 47 and 48 at the junctures thereof with the respective bores 42 and 43.

The member 41 and the wear plate 37 are assembled together within the cavity B of the housing 10 in such a manner that the end surface 46 of the member 41 is adapted to abut an end surface 49 of the wear plate 37. The bores 44 and 45 in the member 41 cooperate with the wear plate 37 to define a pair of annular chambers E and F adapted to respectively receive and support outer races 50 and 51 of a pair of bearing devices G and H. The outer races 50 and 51 respectively carry a plurality of roller bearings 52 adapted to engage the respective journals 27 and 31 of the gears 23 and 24 in order to rotatably support the gears 23 and 24 within the housing 10, the journals 27 and 31 providing inner races for the roller bearings 52.

The members 41 and 41' of the respective bearing means C and D are respectively provided with rear surfaces 53 and 53' adapted to cooperate respectively with the end walls 21 and 22 of the respective housing sections 11 and 13. The rear surface 53' of the bearing means D is disposed in engagement with the flat surface or end wall 22 of the housing section 13. The end wall 53 of the bearing means C cooperates with the end wall 21 of the housing section 11 in the following manner.

As shown in FIGURE 2, the end wall 21 of the housing section 11 is interrupted by a groove 54 which fluidly interconnects the bores 33 and 42 with the bore 43 whereby leakage fluid can be directed back to the inlet in a manner well known in the art.

The end wall 21 is provided with a continuous recess 56 shaped similar to the periphery of the bore means 17—20 of the housing section 12 but being spaced therefrom throughout its entire length in order to cooperate with the flat surface 15 of the housing section 12. The end wall 21 is further interrupted by a pair of annular recesses 57 and 58 respectively and concentrically disposed about the bores 33 and 54, the recesses 57 and 58 being interconnected by parallel recesses 59 and 60 interrupting the end wall 21 and being disposed respectively on the inlet and outlet side of the housing 10. The annular recess 57 is interconnected with the recess 56 by a pair of parallel recesses 61 and 62 interrupting the end wall 21 and being respectively disposed on the inlet and outlet side of the housing 10. Similarly, the annular recess 58 is interconnected with the recess 56 by a pair of parallel recesses 63 and 64 interrupting the end wall 21 and being respectively disposed on the inlet and outlet side of the housing 10. The recesses 59, 61, and 63 are disposed in the same plane on the inlet side of the apparatus A, and, similarly, the recesses 60, 62, and 64 are disposed in the same plane on the outlet side of the apparatus A.

As shown in FIGURE 3, a continuous flexible sealing means 65 is disposed within the recess 56 and is adapted to sealably engage the housing section 11 and the flat surface 15 of the housing section 12. Another continuous sealing means 66 is disposed inside the sealing means 65 and within the inlet side of the recess 56, the recesses 61 and 63, the inlet sides of the recesses 57 and 58, and the recess 59 in the manner illustrated in FIGURE 3. Similarly, a continuous sealing means 67 is disposed inside the sealing means 65 and within the outlet side of the recess 56, the recesses 62 and 64, the outlet sides of the recesses 57 and 58, and the recess 60. The sealing means 66 and 67 respectively define isolated chambers 68 and 69 between the rear surface 53 of the bearing means C and the end wall 21 of the housing section 11 as portions of the sealing means 66 and 67 are in sealing engagement with the rear surface 53 and the end wall 21. As shown in FIGURE 5, the sealing means 66 and 67 respectively divided the rear surface 53 of the bearing means C into isolated segments or areas 70 and 71, the segment 70 being disposed on the inlet side of the apparatus A and the segment 71 being disposed on the outlet side of the apparatus A.

As shown in FIGURES 4 and 5, the wear plate 37 and the member 41 is cut away at 72 and 73 whereby the cut away portions 72 and 73 of the wear plate 37 and member 41 are respectively disposed in spaced relation relative to the respective flat surfaces 19 and 20 of the housing section 12 and thereby respectively cooperate with the flat surfaces 19 and 20 to define passages J and K. In this manner, a portion of the fluid passing to the gears 23 and 24 through the inlet 35 is communicated to the isolated chamber 68 and thus to the isolated segment 70 of the rear surface 53 of the bearing means C by the passage K. Similarly, a portion of the fluid delivered by the gears 23 and 24 to the outlet 36 is communicated to the isolated chamber 69 and thus to the isolated segment 71 by the passage J. The force of the fluid conveyed to the chambers 68 and 69 acts against the isolated segments 70 and 71 of the rear surface 53 of the bearing means C and causes axial movement thereof relative to the housing 10 toward the respective side faces 25 and 29 of the gears 23 and 24. In this manner, the front surface 40 of the bearing means C is adapted to be placed in sealing engagement with the side faces 25 and 29 of the respective gears 23 and 24.

The operation of the hydraulic apparatus A when acting as a hydraulic pump will now be described. If the gear 23 is being rotated counterclockwise, as viewed in FIGURE 4, by the power source (not shown), the gear 24 will be rotated clockwise through the meshing relation thereof with the drive gear 23. As the gears 23 and 24 rotate, the spaces between the gear teeth thereof receive fluid from the inlet 35, trap the fluid therein through the cooperation of the surfaces 40 and 40′ of the bearing means C and D with the respective bores 17 and 18 of the housing 10, and deliver the trapped fluid to the outlet 36. As the fluid is conveyed from the inlet 35 to the outlet 36 by the gears 23 and 24, the flow of the fluid from the outlet 36 being restricted in a manner common in the art in order to place the fluid delivered thereto under pressure, it can be seen that the pressure value of the fluid conveyed by the gears 23 and 24 increases progressively from the inlet 35 to the outlet 36. Therefore, a pressure gradient condition exists in the spaces of the gear teeth, i.e., the pressure value of the fluid in the tooth spaces adjacent the outlet 36 is greater than the pressure value of the fluid in the tooth spaces adjacent the inlet 35, whereby the force of the fluid trapped in the gear tooth spaces acts against the surface 40 of the bearing means C and tends to axially move the bearing means C away from the side faces 25 and 29 of the gears 23 and 24 and thus break the pumping seal therewith. When the pumping seal is broken, it can be seen that the high pressure fluid from the outlet 36 is adapted to escape back to the inlet 35 by passing between the respective side faces 25 and 29 of the gears 23 and 24 and the surface 40 of the wear plate 37 and thus decrease the efficiency of the hydraulic apparatus A.

In order to maintain the surface 40 of the bearing means C in engagement with the sides 25 and 29 of the respective gears 23 and 24 and thus maintain the pumping seal with the gears 23 and 24, a portion of the high pressure fluid from the outlet 36 is conveyed to the isolated chamber 69 by the passage J. The force of the high pressure fluid in the chamber 69 acts against the segment 71 of the rear surface 53 of the bearing means C and causes axial movement thereof toward the gears 23 and 24 in opposition to the force of the fluid trapped in the gear tooth spaces acting against the front surface 40 and tending to move the bearing means C away from the gears 23 and 24 whereby the front surface 40 thereof is placed in sealing engagement with the sides 25 and 29 of the respective gears 23 and 24. Similarly, a portion of the fluid from the inlet 35 is conveyed to the isolated chamber 68 by the passage K whereby the force of the fluid conveyed to the chamber 68 acts against the segment 70 of the rear surface 53 of the bearing means C and tends to maintain the same in engagement with the respective gears 23 and 24 in opposition to the force of the fluid trapped in the gear tooth spaces.

Therefore, it can be seen that the force of the high pressure fluid conveyed to the chambers 69 acts against the segment 71 of the rear surface 53 in the region opposite to where the forces of the fluid in the gear tooth spaces are at the highest values whereas the force of the low pressure fluid conveyed to the chamber 68 acts against the segment 70 of the rear surface 53 in the region opposite to where the forces of the fluid in the gear tooth spaces are at the lowest values. In this manner, the previously mentioned pressure gradient condition from the inlet 35 to the outlet 36 is compensated for by the pressure balancing feature of the segments 70 and 71 of the bearing means C and thus maintains the front surface 40 of the bearing means C in engagement with the sides 25 and 29 of the respective gears 23 and 24 throughout the entire contacting surface 40 thereof. It is to be understood that the areas or segments 70 and 71 of the bearing means C are so selected in relation to areas for the surface 40 thereof which are subject to the application of the force of the fluid trapped in the gear tooth spaces that the resulting from the fluid acting against the rear surface 53 of the bearing means C slightly exceeds the resulting force of the fluid trapped in the gear tooth spaces acting in opposition thereto against the front surface 40 thereof and thereby maintains the bearing means C in sealing engagement with the gears 23 and 24 throughout the entire operating range of the apparatus A.

If it is desired to pump fluid from the outlet 36 to the inlet 35 by reversing the rotation of the gears 23 and 24, it can be seen that the outlet 36 now becomes the inlet and the inlet 35 now becomes the outlet. During this reversed pumping flow, the gears 23 and 24 receive low pressure fluid from the outlet 36, pressurize the same, and deliver the high pressure fluid out the inlet 35. The resulting pressure gradient condition, therefore, increases progressively from the outlet 36 to the inlet 35. However, since the isolated chamber 68 is interconnected with the inlet 35 by the passage K, the force of the high pressure fluid conveyed therethrough acts against the segment 70 of the bearing means C and axially moves the bearing means C into sealing engagement with the respective sides 25 and 29 of the gears 23 and 24. Similarly, a portion of the low pressure fluid at the outlet 36 is communicated to the isolated chamber 69 by the passage J whereby the force of the fluid conveyed to the chamber 69 acts against the segment 71. In this manner, the balancing feature of the segments 70 and 71 compensate for the pressure gradient condition existing across the front surface 40 of the bearing means C.

It is to be understood that the operation of the hydraulic apparatus A when being utilized as a hydraulic motor is substantially the same as that set forth above except that high pressure fluid is delivered to the gears 23 and 24 to cause rotation thereof and thus drive a utilization device interconnected with the shaft or journal 27 of the gear 23.

Therefore, it can be seen that there has been described an improved pressure loaded hydraulic apparatus whereby the bearing means thereof is adapted to be maintained in balanced sealing engagement with the rotatable fluid displacing means regardless of the direction of flow of hydraulic fluid therethrough.

While this invention has been disclosed in connection with a certain specific embodiment thereof, it is to be understood that this was by way of example rather than limitation, and it is intended that the invention be defined by the appended claims.

What is claimed is:

1. A hydraulic apparatus comprising: a housing having a cavity and a pair of end walls closing off said cavity; rotatable means having sides thereon disposed in said cavity; means defining an inlet and an outlet in said housing leading respectively to and from said rotatable means whereby said rotatable means is adapted to receive fluid from said inlet and deliver the same out said outlet; axially movable bearing means disposed in said cavity and rotatably supporting said rotatable means, said bearing means including a plurality of roller means in engagement with said rotatable means; a wear plate positioned intermediate said bearings and said sides, and a rear surface on said bearing means adapted to cooperate with an adjacent end wall to define a chamber; sealing means disposed between said rear surface and said end wall and dividing said rear surface into a plurality of isolated segments; and means for conveying pressure fluid to at least one of said segments whereby the force of the pressure fluid urges said bearing means into engagement with said wear plate and forces said wear plate into engagement with said sides.

2. A hydraulic apparatus comprising: a housing having a cavity and a pair of end walls closing off said cavity; rotatable means disposed in said cavity; means defining an inlet and an outlet in said housing leading respectively to and from said rotatable means whereby said rotatable means is adapted to receive fluid from said inlet and deliver the same out said outlet; axially movable bearing means disposed in said cavity and rotatably supporting said rotatable means, said bearing means including a plurality of members cooperating to support a plurality of roller means in engagement with said rotatable means, a wear plate positioned intermediate said bearing means and said rotatable means, said bearing means having a rear surface adapted to cooperate with an adjacent end wall to define a chamber; sealing means disposed between said rear surface and said end wall and dividing said rear surface into a plurality of isolated segments; and means for conveying pressure fluid to at least one of said segments whereby the force of the pressure fluid urges said bearing means into engagement with said wear plate and forces said wear plate into engagement with said rotatable means.

3. A hydraulic apparatus comprising: a housing having a cavity and a pair of end walls closing off said cavity; rotatable means disposed in said cavity; means defining an inlet and an outlet in said housing leading respectively to and from said rotatable means whereby said rotatable means is adapted to receive fluid from said inlet and deliver the same out said outlet; axially movable bearing means disposed in said cavity and rotatably supporting said rotatable means, said bearing means including a plurality of members cooperating to support a plurality of roller means in engagement with said rotatable means, a wear plate positioned intermediate said bearing means and said rotatable means, said members having a rear surface adapted to cooperate with an adjacent end wall to define a chamber; sealing means disposed between said rear surface and said end wall and dividing said rear surface into a pair of isolated segments; means for conveying fluid from said outlet to one of said segments; and means conveying fluid from said inlet to the other of said segments whereby the force of the fluid acting against said rear surface urges said bearing means into engagement with said wear plate and forces said wear plate into engagement with said rotatable means.

4. A hydraulic apparatus comprising: a housing having a cavity and a pair of end walls closing off said cavity; rotatable means disposed in said cavity; means defining an inlet and an outlet in said housing leading respectively to and from said rotatable means whereby said rotatable means is adapted to receive fluid from said inlet and deliver the same out said outlet; axially movable bearing means disposed in said cavity and rotatably supporting said rotatable means, said bearing means including a plurality of members cooperating to support a plurality of roller means in engagement with said rotatable means, a wear plate positioned intermediate said bearing means and said rotatable means, said members having a rear surface adapted to cooperate with an adjacent end wall to define a chamber; sealing means disposed between said rear surface and said end wall and dividing said rear surface into a pair of isolated segments, one of said segments being disposed adjacent the outlet side of said bearing means and the other of said segments being disposed adjacent the inlet side of said bearing means; means for conveying fluid from said outlet to said one segment; and means conveying fluid from said inlet to said other segment whereby the force of the fluid acting against said rear surface urges said bearing means into engagement with said wear plate to force said wear plate against said rotatable means.

5. A hydraulic apparatus comprising: a housing having a cavity and a pair of end walls closing off said cavity; rotatable means disposed in said cavity; means defining an inlet and an outlet in said housing leading respectively to and from said rotatable means whereby said rotatable means is adapted to receive fluid from said inlet and deliver the same out said outlet; axially movable bearing means disposed in said cavity and rotatably supporting said rotatable means, said bearing means including a plurality of roller means in engagement with said rotatable means; a wear plate positioned intermediate said bearing means and said rotatable means, a rear surface on said bearing means adapted to cooperate with an adjacent end wall to define a chamber; means defining recess means in one of said adjacent end walls and said rear surface; sealing means disposed in said recess means and dividing said rear surface into a plurality of isolated segments; and means for conveying pressure fluid to at least one of said segments whereby the force of the pressure fluid urges said bearing means into engagement with said wear plate and forces said wear plate into engagement with said rotatable means.

6. A hydraulic apparatus comprising: a housing having a cavity and a pair of end walls closing off said cavity; a pair of rotatable elements disposed in said cavity; means defining an inlet and an outlet in said housing leading respectively to and from said rotatable elements whereby said rotatable elements are adapted to receive fluid from said inlet and deliver the same out said outlet; axially movable bearing means disposed in said cavity and rotatably supporting said rotatable elements, said bearing means including a plurality of members cooperating to support a plurality of roller means in engagement with said rotatable elements, a wear plate positioned intermediate said bearing means and said rotatable elements, said bearing means having a rear surface adapted to cooperate with an adjacent end wall to define a chamber; sealing means disposed between said rear surface and said end wall and dividing said rear surface into a plurality of isolated segments; and means for conveying pressure fluid to at least one of said segments whereby the force of the pressure fluid urges said bearing means into engagement with said wear plate and forces said wear plate against said rotatable elements.

7. A hydraulic apparatus comprising: a housing having a cavity and a pair of end walls closing off said cavity; a pair of gears disposed in said cavity, each of said gears having a pair of opposed sides, each of said gears having a pair of journals extending respectively from said sides; means defining an inlet and an outlet in said housing leading respectively to and from said gears whereby said gears are adapted to receive fluid from said inlet and deliver the same out said outlet; a plurality of bearing means disposed in said cavity and respectively supporting said journals, at least one of said bearing means being axially movable relative to said housing, said bearing means each including a plurality of roller means in engagement with the respective journal; a wear plate positioned intermediate said bearing means and said gears, a rear surface on each bearing means adapted to cooperate with an adjacent end wall of said housing to define a chamber; sealing means disposed between said rear surface of said axially movable bearing means and the adjacent end wall and dividing said rear surface into a plurality of isolated segments; and means for conveying pressure fluid to at least one of said segments of said axially movable bearing means whereby the force of said pressure fluid urges said axially movable bearing means into engagement with said wear plate and forces said wear plate against said gears.

8. A hydraulic apparatus comprising: a housing having a cavity and a pair of end walls closing off said cavity; a pair of gears disposed in said cavity having pairs of opposed sides, said gears having a pair of journals extending respectively from said sides; means defining an inlet and an outlet in said housing leading respectively to and from said gear whereby said gear is adapted to receive fluid from said inlet and deliver the same out said outlet; a plurality of bearing means disposed in said cavity and respectively supporting said journals, at least one of said bearing means being axially movable relative to said housing, said bearing means each including a plurality of members cooperating to support a plurality of roller means in engagement with the respective journal, a wear plate positioned intermediate said bearing means and said gears, said members having a rear surface adapted to cooperate with an adjacent end wall of said housing to define a chamber; sealing means disposed between said rear surface of said axially movable bearing means and the adjacent end wall and dividing said rear surface into a plurality of isolated segments; and means for conveying pressure fluid to at least one of said segments of said axially movable bearing means whereby the force of said pressure fluid urges said axially movable bearing means into engagement with said wear plate and forces said wear plate against said gears.

9. A hydraulic apparatus comprising: a housing having a cavity and a pair of end walls closing off said cavity; a pair of gears disposed in said cavity and having a pair of opposed sides, each of said gears having a pair of journals extending respectively from said sides; means defining an inlet and an outlet in said housing leading respectively to and from said gears whereby said gears are adapted to receive fluid from said inlet and deliver the same out said outlet; a plurality of bearing means disposed in said cavity and respectively supporting said journals, at least one of said bearing means being axially movable relative to said housing, said bearing means each including a plurality of members cooperating to support a plurality of roller means in engagement with the respective journal, a wear plate positioned between said gears and said bearing means, said members having a rear surface adapted to cooperate with an adjacent end wall of said housing to define a chamber; sealing means disposed between said rear surface of said axially movable bearing means and the adjacent end wall and dividing said rear surface into a pair of isolated segments; means for conveying fluid from said outlet to one of said segments; and means conveying fluid from said inlet to the other of said segments whereby the force of said fluid acting against said rear surface urges said axially movable bearing means into engagement with said wear plate and forces said wear plate against said gears.

10. A hydraulic apparatus comprising: a housing having a cavity and a pair of end walls closing off said cavity; a pair of gears disposed in said cavity, each of said gears having a pair of opposed sides, said gear having a pair of journals extending respectively from said sides; means defining an inlet and an outlet in said housing leading respectively to and from said gears whereby said gears are adapted to receive fluid from said inlet and deliver the same out said outlet; a plurality of bearing means disposed in said cavity and respectively supporting said journals, at least one of said bearing means being axially movable relative to said housing, said bearing means each including a plurality of members cooperating to support a plurality of roller means in engagement with the respective journal, a wear plate interposed between said bearing means and said gears, said members having a rear surface adapted to cooperate with an adjacent end wall of said housing to define a chamber; sealing means disposed between said rear surface of said axially movable bearing means and the adjacent end wall and dividing said rear surface into a pair of isolated segments, one of said segments being disposed adjacent to outlet side of said axially movable bearing means and the other of said segments being disposed adjacent the inlet side of said axially movable bearing means; means for conveying fluid from said outlet to said one segment; and means conveying fluid from said inlet to said other segment whereby the force of said fluid acting against said rear surface urges said axially movable bearing means into engagement with said wear plate and maintains said wear plate against said gears.

11. A hydraulic apparatus comprising: a housing having a cavity and a pair of end walls closing off said cavity; a pair of gears disposed in said cavity, each of said gears having a pair of opposed sides, each of said gears having a pair of journals extending respectively from said sides; means defining an inlet and an outlet in said housing leading respectively to and from said gears whereby said gears are adapted to receive fluid from said inlet and deliver the same out said outlet; a plurality of bearing means disposed in said cavity and respectively supporting said journals, at least one of said bearing means being axially movable relative to said housing, said bearing means each including a plurality of roller means in engagement with the respective journal; a wear plate interposed between said gears and said bearing means, a rear surface on each bearing means adapted to cooperate with an adjacent end wall of said housing to define a chamber; means defining recess means in one of said adjacent end walls and said rear surface of said axially movable bearing means; sealing means disposed in said recess means and dividing said rear surface of said axially movable bearing means into a plurality of isolated segments; and means for conveying pressure fluid to at least one of said segments of said axially movable bearing means whereby the force of said pressure fluid urges said axially movable bearing means into engagement with said wear plate and forces said wear plate against said gears.

12. A hydraulic apparatus comprising: a housing having a cavity and a pair of end walls closing off said cavity; a pair of meshing gears disposed in said cavity, each gear having a pair of opposed sides and a pair of journals extending respectively from said sides; means defining an inlet and an outlet in said housing leading respectively to and from said gears whereby said gears are adapted to receive fluid from said inlet and deliver the same out said outlet; a plurality of bearing means disposed in said cavity and respectively supporting said journals, at least one of said bearing means being axially movable relative to said housing, said bearing means each including a plurality of members cooperating to support a plurality of roller means in engagement with a pair of adjacent journals, a wear plate positioned between said gears and said bearing means, said members having a rear surface adapted to cooperate with an adjacent end wall of said housing to define a chamber; sealing means disposed between said rear surface of said axially movable bearing means and the adjacent end wall and dividing said rear surface into a plurality of isolated segments; and means for conveying pressure fluid to at least one of said segments of said axially movable bearing means whereby the force of said pressure fluid urges said axially movable bearing means against said wear plate and urges said wear plate against said gears.

References Cited in the file of this patent

UNITED STATES PATENTS

| | | |
|---|---|---|
| 2,040,754 | McLeod | May 12, 1936 |
| 2,044,873 | Beust | June 23, 1936 |
| 2,682,836 | Orr | July 6, 1954 |
| 2,707,441 | Drennen | May 3, 1955 |
| 2,714,856 | Kane | Aug. 9, 1955 |
| 2,809,592 | Miller et al. | Oct. 15, 1957 |
| 2,816,510 | Jarvis | Dec. 17, 1957 |
| 2,824,524 | Banker | Feb. 25, 1958 |
| 2,842,066 | Hilton | July 8, 1958 |
| 2,864,315 | Udale | Dec. 16, 1958 |
| 2,923,248 | Hodgson | Feb. 2, 1960 |
| 2,932,254 | Booth et al. | Apr. 12, 1960 |

FOREIGN PATENTS

| | | |
|---|---|---|
| 734,394 | Germany | Apr. 15, 1943 |
| 769,763 | Great Britain | Mar. 13, 1957 |
| 781,238 | Great Britain | Aug. 14, 1957 |
| 782,701 | Great Britain | Sept. 11, 1957 |
| 1,073,038 | France | Mar. 17, 1954 |
| 1,121,180 | France | Apr. 30, 1956 |